April 21, 1925.
J. L. OBERDORFER
LOCK FOR RADIATOR CAPS
Filed April 24, 1923
1,534,607
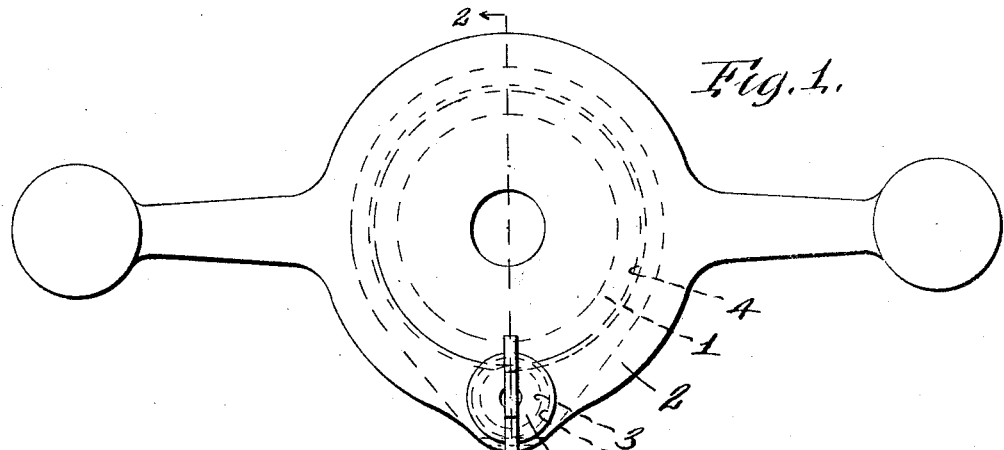
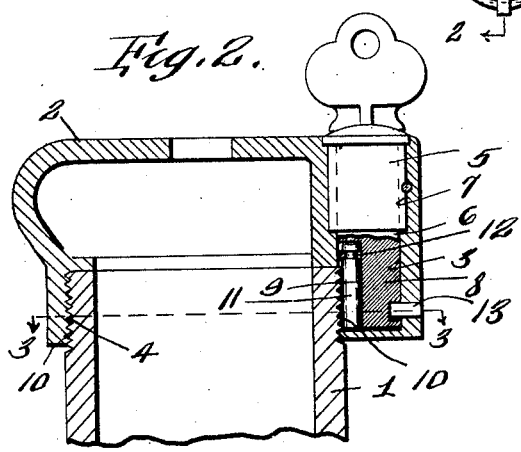
Jonas L. Oberdorfer, INVENTOR.
BY Parsons & Bedell, ATTORNEYS.

Patented Apr. 21, 1925.

1,534,607

UNITED STATES PATENT OFFICE.

JONAS L. OBERDORFER, OF SYRACUSE, NEW YORK.

LOCK FOR RADIATOR CAPS.

Application filed April 24, 1923. Serial No. 634,371.

*To all whom it may concern:*

Be it known that I, JONAS L. OBERDORFER, a resident of Syracuse, in the county of Onondaga and State of New York, have invented a certain new and useful Lock for Radiator Caps, of which the following is a specification.

This invention has for its object a particularly simple and efficient means for locking two threaded parts together to prevent the removal or unscrewing of one part from the other, such as a radiator cap, from the nozzle of the radiator of a motor vehicle into or onto which radiator it threads, which lock is particularly simple in construction, readily applied to one of the parts as the removable part or cap without modification of the other part or nozzle.

The invention consists in the novel features, and in the combinations and constructions hereinafter set forth and claimed.

In describing this invention, reference is had to the accompanying drawings in which like characters designate corresponding parts in all the views.

Figure 1 is a plan view of a radiator cap provided with my invention.

Figure 2 is a sectional view taken on line 2—2, Fig. 1.

Figure 3 is a sectional view taken on the plane of line 3—3, Fig. 2.

Figures 4 and 5 are detail views of the roller clutch and carrier therefor.

This invention comprises, generally, two parts connected together by screw threads, a lock for preventing retrograde or unscrewing movement of one part relatively to the other, comprising lock mechanism including a roller clutch carried by one of said parts, and arranged to engage the threaded surface of the other of said parts, a movable carrier for the roller operable by the lock mechanism to shift the clutch into and out of position to operatively engage such threaded surface.

It will be understood that the term "roller clutch" is intended to cover equivalents such as ball clutches.

I have here illustrated my invention as applied to a radiator cap. Some radiator caps thread into the nozzle of the radiator and others thread onto the periphery of the nozzle. I have here illustrated my invention as applied to a radiator cap of the latter type threading on the periphery of the nozzle.

1 designates the nozzle of the radiator and 2 the cap threading thereon, the cap being formed with a recess 3 extending lengthwise thereof or transversely of its threaded surface 4, this recess 3 opening through the threaded surface 4.

5 is a casing for a suitable key operated lock mechanism including a rotatable spindle 6, this casing here illustrated being suitably secured in a chamber 7 alined with the recess 3.

8 is a clutch carrier. This carrier is preferably an extension of the spindle 6 and is here illustrated as rotatable with the spindle to be shifted to carry the roller clutch into and out of operative relation to the threaded surface of the nozzle 1, the carrier 8 being provided with a lengthwise recess or surface 9 arranged to be moved by the movement of the spindle 6 about its axis into converging relation to the threaded surface 10 of the nozzle to cause the roller to bind on such surface when the cap is turned in a retrograde direction, and to permit the cap to be turned or screwed onto the nozzle in a forward direction and to be shifted by the spindle out of such converging relation to permit the cap to be unscrewed and removed from the nozzle 1. 11 is the roller suitably secured to the carrier on the spindle, it being here shown as formed with a peripheral groove 12 at one end which receives retaining means associated with the spindle. This retaining means is here shown as a bridge or tongue extending transversely over the roller and through the groove 12.

The movement of the carrier is limited in opposite directions by suitable stops 13 engaging the end walls of recesses in the carrier.

In operation, by turning the lock mechanism by means of the key to unlocked position, the surface 9 is moved out of converging relation to the threaded surface of the nozzle so that the roller 11 is out of operative engagement with the threads of the nozzle and will not bind on the nozzle when the cap is unscrewed. In replacing the cap, it is immaterial whether the lock is in locked or unlocked position as during the screwing on movement of the cap the roller moves to the wider portion of the roller recess formed by the surface 9 and threaded surface 10 of the nozzle, and hence does not bind on the threaded surface 10 of the nozzle. However, during retrograde or unscrewing movement of the cap, the roller will move into the narrow portion of such recess formed by the converging surface 9 and the threaded surface 10 of the nozzle and bind on the nozzle.

This lock is particularly advantageous in that it is readily applied to the cap and requires no modification or attachments of the nozzle.

What I claim is:

1. The combination of a threaded cap provided with a recess opening through the threaded surface of the cap, a lock comprising a roller clutch arranged so that the roller is opposed to said threaded surface, and a carrier for the roller mounted in said recess to be shiftable thereon to carry the roller into operative and inoperative relation, substantially as and for the purpose set forth.

2. The combination of two parts, one threading on the other, a lock comprising a roller clutch carried by one part and coacting with the threaded surface of the other part, a carrier for the clutch and key operated means for shifting the carrier to move the roller into and out of operative locking relation, substantially as and for the purpose specified.

3. The combination of two parts, one threading on the other, a roller clutch carried by one part and coacting with the threaded surface of the other part, a carrier for the clutch, and means for shifting the carrier into and out of operative position, said means comprising key operated lock mechanism connected to the carrier, substantially as and for the purpose set forth.

4. The combination of two parts, one threading on the other, of a roller clutch carried by one of the parts and coacting with the threaded surface of the other part, a spindle for the clutch movable about an axis to shift the roller into and out of locking relation, and lock mechanism connected to the spindle, and arranged in alinement therewith, substantially as and for the purpose described.

In testimony whereof, I have hereunto signed my name, at Syracuse, in the county of Onondaga, and State of New York, this 2nd day of April, 1923.

JONAS L. OBERDORFER.